United States Patent
Beaurepaire et al.

(10) Patent No.: US 10,710,603 B2
(45) Date of Patent: Jul. 14, 2020

(54) SEGMENT ACTIVITY PLANNING BASED ON ROUTE CHARACTERISTICS

(71) Applicant: HERE Global B.V., Eindhoven (NL)

(72) Inventors: Jerome Beaurepaire, Berlin (DE); Huib Kalb, Terheijden (NL); Sjoerd Spaargaren, Tilburg (NL); Sigrid Van Veen, Klein Zundert (NL); Kiranmayee Mhetre, Eindhoven (NL)

(73) Assignee: HERE Global B.V., Eindhoven (NL)

( * ) Notice: Subject to any disclaimer, the term of this patent is extended or adjusted under 35 U.S.C. 154(b) by 426 days.

(21) Appl. No.: 15/297,323

(22) Filed: Oct. 19, 2016

(65) Prior Publication Data

US 2018/0107216 A1 Apr. 19, 2018

(51) Int. Cl.
| | | |
|---|---|---|
| *G05D 1/00* | (2006.01) | |
| *G05D 1/02* | (2020.01) | |
| *B60W 50/08* | (2020.01) | |
| *G06Q 30/02* | (2012.01) | |
| *G01C 21/34* | (2006.01) | |
| *G01C 21/32* | (2006.01) | |

(52) U.S. Cl.
CPC .............. *B60W 50/08* (2013.01); *G01C 21/32* (2013.01); *G01C 21/3461* (2013.01); *G06Q 30/0259* (2013.01); *G06Q 30/0261* (2013.01)

(58) Field of Classification Search
CPC ....... B60W 50/08; G01C 21/34; G01C 23/00; G06Q 30/0259; G06Q 30/0261
USPC .......................................................... 701/25
See application file for complete search history.

(56) References Cited

U.S. PATENT DOCUMENTS

| | | | |
|---|---|---|---|
| 8,606,455 B2 | 12/2013 | Boehringer et al. | |
| 9,188,985 B1 | 11/2015 | Hobbs et al. | |
| 9,307,365 B2 | 4/2016 | Sheha et al. | |
| 2007/0216521 A1* | 9/2007 | Guensler | G08G 1/0104 340/439 |
| 2014/0180914 A1* | 6/2014 | Abhyanker | G01C 1/00 705/39 |
| 2015/0202770 A1* | 7/2015 | Patron | G05D 1/024 700/245 |
| 2016/0093211 A1 | 3/2016 | Giesler et al. | |
| 2016/0232777 A1* | 8/2016 | Jedwab | G08B 25/001 |

(Continued)

FOREIGN PATENT DOCUMENTS

| | | |
|---|---|---|
| DE | 102013212776 A1 | 1/2015 |
| EP | 2916190 A1 | 9/2015 |

(Continued)

OTHER PUBLICATIONS

Research for Tran Committee—Self-piloted Cars: the Future of Road Transport?, Policy Department Structural and Cohesion Policies, European Parliament, http://www.europarl.europa.eu/RegData/etudes/STUD/2016/573434/IPOL_STU(2016)573434_EN.pdf, Mar. 2016.

*Primary Examiner* — Anne Marie Antonucci
(74) *Attorney, Agent, or Firm* — Lempia Summerfield Katz LLC

(57) ABSTRACT

Embodiments include apparatus and methods for matching activities with one or more segments. A series of road segments, which may form a route to at least one destination, are identified. A road property for at least one of the segments is accessed. An activity or activity sequence is selected based on the road property for the at least one of the segments.

20 Claims, 10 Drawing Sheets

| | |
|---|---|
| SEGMENT A | ACTIVITY 1 |
| SEGMENT B | NONE |
| SEGMENT C | ACTIVITY 2 |
| SEGMENT D | NONE |
| SEGMENT E | ACTIVITY 3, 2, 1 |
| SEGMENT F | ACTIVITY 2, 1 |
| SEGMENT G | ACTIVITY 2, 1 |
| SEGMENT H | ACTIVITY 3, 2, 1 |
| SEGMENT I | ACTIVITY 2 |
| SEGMENT J | ACTIVITY 2 |

(56) References Cited

U.S. PATENT DOCUMENTS

2017/0008523 A1* 1/2017 Christensen ......... G05D 1/0061
2017/0332208 A1* 11/2017 Cardoso de Moura ......................
                                                          H04W 4/046
2018/0053405 A1*  2/2018 de Azevedo ......... G08G 1/0133

FOREIGN PATENT DOCUMENTS

WO    WO2015049231 A1    4/2015
WO    WO2016058840 A1    4/2016

* cited by examiner

| SEGMENT A | AUTONOMOUS |
| --- | --- |
| SEGMENT B | NONE |
| SEGMENT C | AUTONOMOUS |
| SEGMENT D | NONE |
| SEGMENT E | AUTONOMOUS |
| SEGMENT F | AUTONOMOUS |
| SEGMENT G | AUTONOMOUS |
| SEGMENT H | AUTONOMOUS |
| SEGMENT I | NONE |
| SEGMENT J | NONE |

| SEGMENT A | ACTIVITY 1 |
| --- | --- |
| SEGMENT B | NONE |
| SEGMENT C | ACTIVITY 2 |
| SEGMENT D | NONE |
| SEGMENT E | ACTIVITY 3, 2, 1 |
| SEGMENT F | ACTIVITY 2, 1 |
| SEGMENT G | ACTIVITY 2, 1 |
| SEGMENT H | ACTIVITY 3, 2, 1 |
| SEGMENT I | ACTIVITY 2 |
| SEGMENT J | ACTIVITY 2 |

| SEGMENT SERIES | ACTIVITY TYPE 1 | ACTIVITY TYPE 2 | ACTIVITY TYPE 3 |
|---|---|---|---|
| SEGMENTS A, B, C, D, E | 40% | 20% | 40% |
| SEGMENTS A, B, C, K, H | 1.2 km | 0.5 km | 0.3 km |
| SEGMENTS A, B, I, G, H | 4:00 | 6:00 | 2:30 |
| SEGMENT A, F, I, C, K, H | 60% | 80% | 40% |
| SEGMENTS A, F, J, D | 40% | 20% | 0% |
| SEGMENTS A, F, G, H | 0% | 0% | 0% |
| SEGMENT L | 100% | 100% | 100% |

SEGMENT ACTIVITY PLANNING BASED ON ROUTE CHARACTERISTICS

FIELD

The following disclosure relates to the selection of one or more activities for a user traveling along a segment of a route, in an autonomous or otherwise driver assisted vehicle, based on characteristics of the segment and/or characteristics of the route.

BACKGROUND

The term autonomous vehicle refers to a vehicle including automated mechanisms for performing one or more human operated aspects of vehicle control. As autonomous vehicles are adopted, several benefits may be realized. Vehicle collisions may be reduced because computers can perform driving tasks more consistently and make fewer errors than human operators. Traffic congestion may be alleviated because autonomous vehicles observe specified gaps between vehicles, preventing stop and go traffic. The reduced traffic and increased safety may lead to higher speed limits and associated efficiencies.

Autonomous vehicles may allow drivers to focus their attention elsewhere, such as eating, drinking beverages, working on a laptop, talking on a phone, or sleeping. Autonomous features may be operable only on certain roads or certain types of roads. Challenges remain in regulating activities available to users of autonomous vehicles.

SUMMARY

In one embodiment, a method includes identifying a route to at least one destination, the route including a plurality of segments, identifying data indicative of driving assistance availability, accessing at least one road property for at least one of the plurality of segments for the route, performing a comparison of at least one activity profile to the at least one road property, and selecting an activity for the route based on the comparison and the driving assistance availability.

Another embodiment includes an apparatus including at least a geographic database, a user input device, and a controller. The geographic database includes road segments associated with at least one road characteristic. The user input device is configured to receive at least one selection of an activity. The controller is configured to calculate a route to a destination using road segments accessed from the database and identify an activity sequence based on the at least one selection of the activity at the at least one road characteristic for the route to the destination.

In another embodiment, a non-transitory computer readable medium includes instructions that when executed are operable to Identify a plurality of segments, access a road characteristic for at least one of the plurality of segments, and select an activity sequence for the plurality of segments based on the road characteristic for the at least one of the plurality of segments.

BRIEF DESCRIPTION OF THE DRAWINGS

Exemplary embodiments of the present invention are described herein with reference to the following drawings.

DETAILED DESCRIPTION

Figure 1:
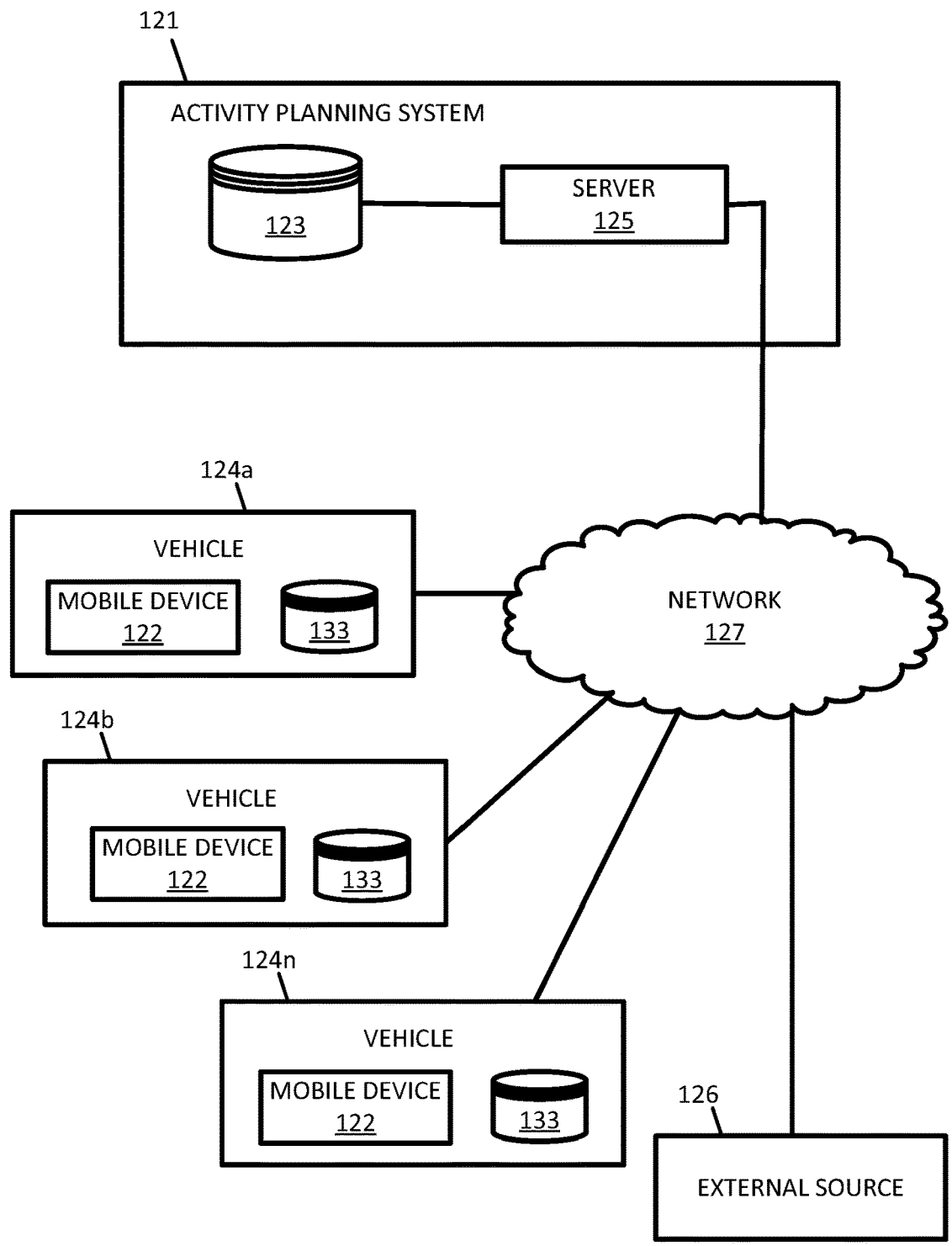
FIG. 1 illustrates an example system for activity planning for road segments.

The term autonomous vehicle encompasses a variety of levels of driver assistance systems available in motor vehicles. A vehicle may be configured for one of the variety of levels of driver assistance systems. Alternatively, a vehicle may be configured for multiple levels of driver assistance systems, which may be associated with different operational modes. Some levels may rely on the driver taking over in any situation, other levels may require this fallback in selected situations (e.g. with good weather or visibility, on a highway, stop and go traffic, or another situation). Some conditions such as poor visibility may cause a vehicle to hand over control and/or disable automatic mode. The required attention level of the driver-passenger may be tied to the vehicles capabilities.

A full automation autonomous vehicle or a mode in an autonomous vehicle refers to a system in which substantially all of the driving aspects of the driving tasks are handled without consistent management of a human driver. Substantially all of the driving aspects may include a set of tasks sufficient to pilot the vehicle through those roadway and environmental conditions typically faced by the vehicle. A high automation autonomous vehicle or mode in an autonomous vehicle refers to a system in which substantially all of the driving aspects of the driving tasks are handled without management of a human driver in some driving modes. A conditional automation autonomous vehicle or mode in an autonomous vehicle refers to a system in which substantially all of the driving aspects of the driving tasks are handled automatically unless a human driver intervenes. A partial automation autonomous vehicle or mode in an autonomous vehicle refers to a system in which select driving aspects of the driving tasks are handled by the system unless intervened by a human driver. In one example, the select driving aspects include acceleration, deceleration, and steering. The human driver retains other driving aspects including monitoring the driving environment and all other vehicle control aspects. A driving assistance vehicle or mode in an autonomous vehicle provides instructions to the human driver regarding the driving environment, with the human driver retaining control over substantially all of the driving aspects of the driving tasks, and the autonomous vehicle may intervene with certain tasks (e.g., deceleration or steering), when certain urgent stimuli are detected in the proximity of the vehicle. A numbering scheme may describe a type of autonomous driving or a degree of driving assistance available (e.g., 5=full automation mode, 4=semi-automation mode, 3=conditional automation mode, 2=partial automation mode, 1=driving assistance mode, and/or 0=no autonomous driving or tradition driving mode).

Depending on a variety of factors, different activities may be available to the human driver or other passengers of the autonomous vehicle. As used herein, the term user refers to a human driver or passenger, and the designation of driver versus passenger may transition back and forth depending on the situation and the mode of the vehicle. As some representative examples of activities, consider the activities listening to music, talking on the phone, and sending an email. Each of these activities requires a different level of attention from the user. In order for the user to send an email, the user may need to devote nearly all attention away from driving related tasks. Thus, the activity of sending an email may only be available when the user has no responsibility for driving related tasks. Talking on the telephone requires much less attention, but is usually considered dangerous when all driving aspects are performed by the human driver. However, when the human driver is not driving but merely monitoring the autonomous driving system for alerts or warnings, talking on the phone may be considered an acceptable activity. Listening to the radio may be considered safe in all situations, regardless of the amount of attention the user has available. However, it could be possible that in some situations that require the user be very attentive (e.g., high traffic areas), even the radio could be an unsafe distraction.

Some road segments or road conditions may be conducive for certain activities. An activity profile for the route may describe the types of activities that are available or enabled at different segments along the route. The following embodiments includes devices and processes for determining an activity sequence for a particular route and comparing routes based on available activity sequences.

System Overview

FIG. 1 illustrates an example system for activity planning and/or routing based on activities. In FIG. 1, one or more vehicles 124a, 124b, . . . 124n are connected to the server 125 though the network 127. The vehicles 124a-n may be directly connected to the server 125 or through an associated mobile device 122. A map developer system 121, including the server 125 and a geographic database 123, exchanges (e.g., receives and sends) data from the vehicles 124a-n. The mobile devices 122 include databases 133 corresponding to a local map, which may be modified according to the server 125. The mobile device 124a-n may be standalone device such as smartphones or devices integrated with vehicles. Additional, different, or fewer components may be included.

The database 123 may include a map specialized for one or more of the types of autonomous driving. The map may include road segments or road links that are connected at nodes. Each road segment may be stored in association with various characteristics or properties, which are discussed in more detail below, including road characteristic or road property. The road characteristic may be a single bit that describes whether or not any autonomous driving is available in the road segment. The existence of an autonomous driving enabled map, such a high definition (HD) map, may be indicative that autonomous driving is available for all road segments of the HD map.

The server 125 or the vehicle 124 may calculate a route from an origin to a destination. The origin and/or the destination may be received at the server 125 from the vehicle 124 and the route is calculated from the geographic database 123. Alternatively, the route may be calculated from local database 133. The route includes multiple segments stored in either of the databases. The route may be calculated according to the shortest distance, based on length or distance of the set of road segments, or according the estimated time to traverse the set of road segments. Example routing techniques include the A* algorithm and the Dijkstra algorithm.

As an initial determination, the vehicle 124 may report to the server 125 data indicative of driving assistance availability including one or more levels or modes of autonomous driving that may be performed by the vehicle 124. The server 125 may confirm the available levels of autonomous driving before proceeding with determining the activity sequence for the route.

The server 125 is configured to access the road characteristic for at least one of the segments for the route. The database 123 may include a lookup table that associates road segment identifiers with respective road characteristics. The server 125 queries the lookup table with segment identifiers for the set of road segments and receives the road characteristics for the route.

The server 125 is configured to select an activity sequence for the route based on the road property for the at least one of the segments of the route and the driving assistance availability. The activity sequence may define one or more activities that may be performed along the route. The activity sequence may include multiple activities that are paired with particular road segments. Each activity in the activity sequence may be matched with the route according to the road characteristics for particular road segments. The activity sequence may specify an order for the activities that maximizes the activity time that can be completed along the route. The activity sequence may match a list of preferred activities with the road characteristics for particular road segments. Different road characteristics may be quantified with scores or values. Activities may be matched with multiple road characteristics with an activity profile that provides a minimum or range of scores for each of the multiple road characteristics. As described in examples below, the road characteristics may include road quality, or curviness, traffic, network connectivity, noisiness, luminosity or other characteristics.

The server 125 may send the activity sequence to the vehicle 124 and/or mobile device 122. The mobile device 122 may display activity recommendation to the user based on the activity sequence. The mobile device 122 may provide a display of activity selections according to the activity sequence. The mobile device 122 may enable or disable functions associated with the activity sequence according to the activity sequence. For example, when the activity lists activity A for road segments 1 and 2 along the route and activity B for road segment 3 along the route, the mobile device 122 may enable activity A only while the mobile device 122 and/or vehicle 124 are traveling along road segments 1 and 2 and enable activity B only when traveling along road segment 3. The mobile device 122 may perform the activity selection in addition to or alternative to the server 125. The same functionality of the server 125 may be implemented on the vehicle/mobile device. In that scenario, the mobile device 122 locally matches the road properties to the activities by retrieving road properties from a local offline map database or from an online map database.

Activity Sequence Assignment

Figure 2:
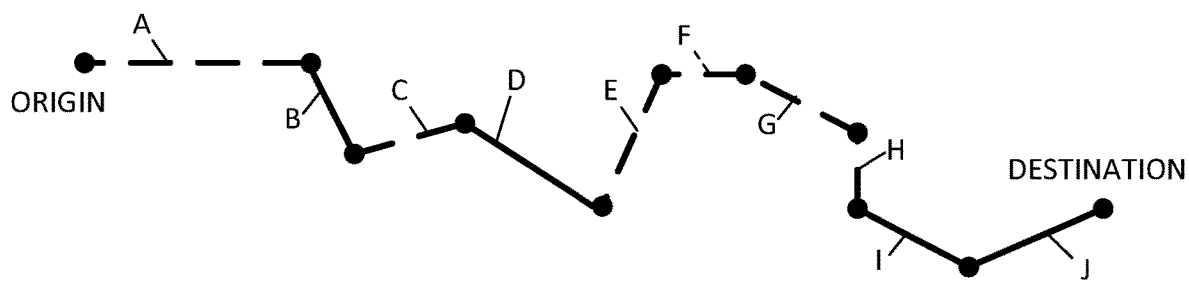
FIG. 2 illustrates an example route and table for activity planning for the example route based on autonomous driving availability.

FIG. 2 illustrates an example route and table 40 for activity planning for the example route based on autonomous driving availability. The route extends from the origin location to the destination location through a set of road segments A-J. The destination location may be received from the mobile device 122 (e.g., use input for destination selection or location data for the current position of the mobile device 122) or may be the result of a destination prediction performed by the mobile device 122 or the server 125. The destination prediction identifies the destination location based on habits of the mobile device 122.

The mobile device 122 or the server 125 may identify segments in which autonomous driving is available without regard to the type of activity or the degree of autonomous driving. The dotted lines in the route of FIG. 2 indicate that segments A, C and E-H are enabled for autonomous driving. The mobile device 122 or the server 125 may access the database 123 or 133 respectively to determine whether particular segments are compatible with any type of autonomous or highly assisted driving. Each road segment may include a characteristic or flag that states whether or not the segment is compatible with any type of autonomous or highly assisted driving.

The mobile device 122 or the server 125 may determine compatibility in a variety of techniques. In one example, the compatibility with any type of autonomous or highly assisted driving may be determined by functional classification or the type of road segment. Types may include a highway, a collector road, an arterial road, or a local road. For example, arterial roads, or road segments having a functional classification greater than a predetermined number, are considered compatible. Alternatively, compatibility may be determined based on current conditions. For example, during stop and go traffic, or traffic congestion values higher than a predetermined value, road segments are considered incompatible, or during inclement weather, or weather values higher than a predetermined value, road segments are considered incompatible. Another alternative for determining compatibility may be the availability of a particular type map data. The particular type of map data may depend on resolution of the map data such that only resolutions above a threshold are considered compatible with autonomous driving. Another alternative for determining compatibility may be a version value that indicates the version of the map data or an update value that indicates an amount of time since the map data was updates.

The mobile device 122 or the server 125 may assign the activity sequence to the road segments of the route for activity planning for the example route based on autonomous driving availability. Table 40 lists the road segments of the route and an activity sequence that activities may be performed in a first set of road segments (e.g., A, C, and E-H) but activities may not be performed in a second set of road segments (e.g., B, D, I, and J).

Figure 3:
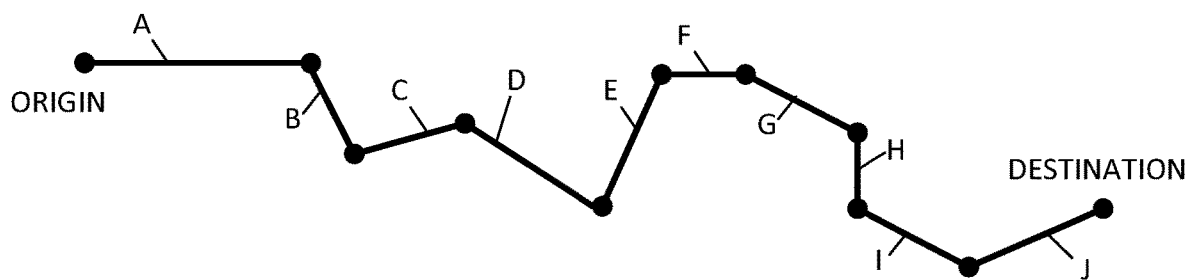
FIG. 3 illustrates an example route and table for activity planning for the example route based on activity availability.

FIG. 3 illustrates an example route and table for activity planning for the example route based on activity availability. In this embodiment, the route is selected and is not variable, and the server 125 or mobile device 122 assigns the activity plan to the given route.

Example activities may include high attentive activities, medium attentive activities, and low attentive activities. The activities may be assigned numerical values (e.g., high attentive activities=3, medium attentive activities=2, low attentive activities=1). The activities may be categorized as high, medium, or low based on the typical amount of time a user needs to transition attention away from the activity and to the operation of the vehicle. High attentive activities require the most time to transition back to the operation of the vehicle and low attentive activities require the least time to transition back to the operation of the vehicle.

Example high attentive activities include activities on the mobile device 122 that require interactive data input such as emailing, working, operating mobile apps, applying makeup, or playing video games. Other high attentive activities may include reading a book or magazine. Sleeping is also a high attentive activity, and make be classified separately as completely attentive as the user is unconscious and requires even more time to transition back to operation of the vehicle than other high attentive activities.

Example medium attentive activities include talking on the phone, watching television, or navigation related activities such as selecting the destination, searching for points of interest, checking traffic, or checking weather using the mobile device 122. Example low attentive activities include drinking, eating, or listening to the radio. The assignment of high, medium, and low attention requirements to activities may be user-configurable through settings received at the mobile device 122 or may be set according to local rules and regulations.

Other activity groupings are possible. The groupings are activities may be associated with autonomous driving modes or levels of driving assistance available. The association may be direct (a particular level or mode is assigned to a type of activity) or indirect (a particular level or mode is assigned to one or more activities depending on other factors). The levels may be a standard maintained, for example, by the Society of Automotive Engineers (SAE) or the National Highway Traffic Safety Administration (NHTSA). As an example, the numbering scheme may be 5=full automation level, 4=semi-automation level, 3=conditional automation level, 2=partial automation level, 1=driving assistance level, and/or 0=no autonomous driving or tradition driving level.

In one example, an automation level 2 (e.g. only adaptive cruise control) can only engage in activities that allow full concentration on the events on the road. The vehicle may only slow down if the vehicle ahead slows down, but will not swerve to avoid a car from another lane. Under such conditions, activities for a Level 2 vehicle might be limited to listening to music, phone conversations with hands-free equipment and the like.

An automation level 3 vehicle may require the user to take over abruptly, even without notice, but the vehicle allows for automatic control of steering and acceleration/breaking broadening the range of activities (e.g. eating, interacting with the navigation system, or another activity that allow the user to take the eyes off the road for brief time periods). An automation level 4 vehicle does not request that the user to take over in any circumstance until the segment where autonomous driving is offered ceases. A user may be allowed even to sleep for the duration of the segment.

Different road segments along the route may be assigned to different categories of activities. Table 50 illustrates an example lookup table that may be stored at mobile device 122 (e.g., local database 133) or server 125 (e.g., database 123) for associating road segments with available activities. The table 50 is an example road segment sequence for the route. In the example illustrated, some activities are available in segment A, but the user must return to operation of the vehicle in segment B. Different activities are available in segment C, but the user must return to the operation of the vehicle in segment D. Finally, various activities are available from segments E to J.

While not illustrated, the table 50 may also include an estimated duration for each segment. The estimated duration is an amount of time required to traverse the road segment. The estimated duration may also include a variance value that indicates the expected amount of deviation for the road segment such as within two standard deviations. For example, 3:20/0:30 indicates 3 minutes and 20 seconds with a positive or negative variance of 30 seconds depending on external factors.

In one example, the table 50, or similar arrangement of data such as a chart or graph may be displayed by the mobile device 122 as a route overview. The user may plan the trip accordingly by planning activities to perform along the route based on the activities available and the amount of time. As some initial examples, the user may choose not to starting eating a meal at segment A if only 1 minute of time expected for this segment. Instead, the user may choose to save the meal for the stretch of the route at road segments E-H when more continuous time is available for low attentive activities. Likewise, the user may not select a medium attentive activity in segment C and delay because a long continuation stretch is available a road segments E-J.

In other examples, which are discussed in more detail below, the mobile device 122 or the server 125 may automatically select the activities in an activity sequence. A list of activities is received from the user. The list of activities may be entered through a series of questions to the user (e.g., "Would you like to read during this trip?" or "Should preference be given to time for a meal during this trip?") or a selection of activities from a list. The mobile device 122 or server 125 is configured to compare the list of activities to the activity sequence to assign particular activities to the route. Various combination of activity assignments may be compared to maximize the amount of time on the route that is utilized for desired activities. For example, referring to the example of FIG. 2, if a high attentive activity (activity 3) is requested, it takes priority in segments E and H because no other times are available for high attentive activities.

Alternatively, the user may initiate the mobile device 122. For example, the user may actively query times along a route that are best suited for a particular activity. For example, the user may request an activity and a route and receive a suggested time from the mobile device 122, or indirectly from the server 125. An example query may include "When will be the best time to call contact X on the route today?" or "When will be the best time to perform activity X on the route today?" A user may also request that an autonomous portion of the routed be extended from an initial length to an extended length to give time for a particular activity.

The mobile device 122 or the server 125 may assign the activity sequence to the road segments of the route for activity planning for the example route based on autonomous driving availability. Table 50 lists the road segments of the route and a type of compatible activity. The server 125 may send the activity sequence to the mobile device 122, and the mobile device 122 may enable or disable applications or features based on the activity sequence. Additional results from the association of the activity sequence to the road segments are discussed in subsequent sections.

Route Selection Based on Activity

Figure 4:
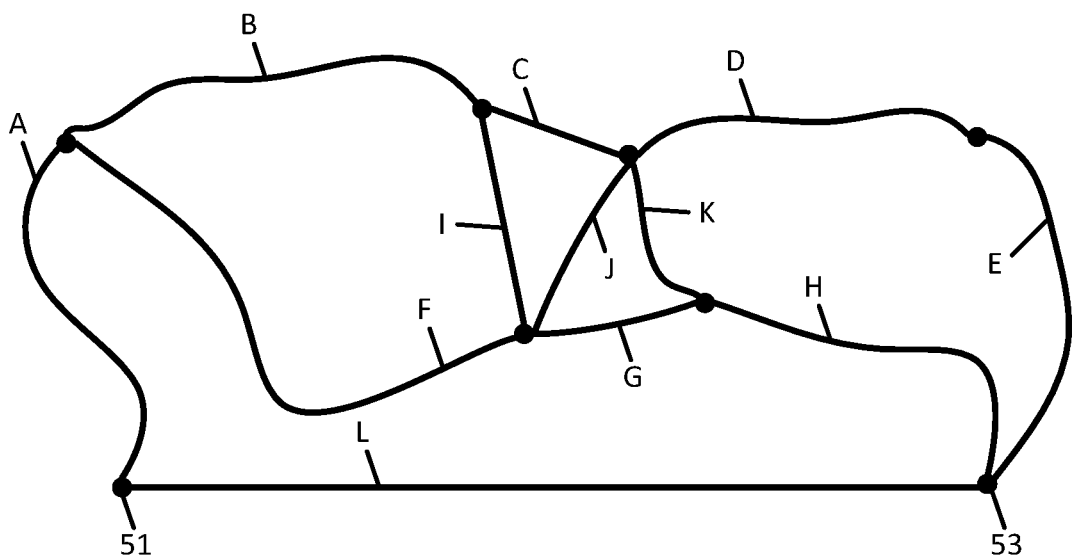
FIG. 4 illustrates an example set of alternate routes and a table for route comparison.

FIG. 4 illustrates an example set of alternate routes and a table 55 for route comparison for routes between origin location 51 and destination location 53. In this embodiment, the route is variable, and the server 125 or mobile device 122 selects the route based on activity selections.

The route from the original location 51 and the destination location 53 in the example of FIG. 4 may take several different paths. An incomplete list of examples includes the path of road segments A-B-C-D-E, the path of road segments A-B-C-K-H, the path of road segments A-B-I-G-H, the path of road segments A-F-I-C-K-H, the path of road segments A-F-J-D-E, the path of road segments A-F-G-H, and the path including only road segment L.

The server 125 or the mobile device 122 may receive a selection of an activity or a series of activities from a user input. The activity selections may include individual activities or types of activities. The activity selections may include a priority of individual activities (e.g., eating a meal takes priority over reading a book, which takes priority over emailing) or a priority of types of activities (e.g., high attentive take priority over medium attentive activities, which take priority of low attentive activities). The activity selections may include an estimated time for each of the activities.

The server 125 or the mobile device 122 may compare the activity selections to the possible routes. The activity selections may be matched to optimize the amount of activities that can be performed along the route. For example, the amount of the selected activities that can be performed on a first route is calculated and the amount of the selected activities that can be performed on a second route is calculated. The server 125 or the mobile device 122 selects the route that best satisfies the activity selections.

Table 55 illustrates possible series of road segments between origin location 51 and the destination location 53 and activity availability along the route. The activity availability may be described in terms of a percentage or proportion of the series of road segments. For example, the series of road segments A-B-C-D-E are associated with percentages, including 40% for activity 1 indicating that 40% of the series of road segments are compatible with activity type 1, 20% for activity 2 indicating that 20% of the series of road segments are compatible with activity type 2, and 40% for activity 3 indicating that 40% of the series of road segments are compatible with activity type 3.

The activity availability may be described in terms of distance. For example, road segments A-B-C-D-H are associated with distances, including 1.2 km for activity 1 indicating that 1.2 km of the route is compatible with activity 1, including 0.5 km for activity 2 indicating that 0.5 km of the route is compatible with activity 2, and including 0.3 km for activity 3 indicating that 0.3 km of the route is compatible with activity 3. The activity availability may be described in terms of time. For example, road segments A-B-I-G-H in table 55 are associated with times, including 4 minutes for activity 1 indicating that approximately 4 minutes of the route is compatible with activity 1, 6 minutes for activity 2 indicating that approximately 6 minutes of the route is compatible with activity 2, and 2 and one half minutes for activity 3 indicating that approximately 2:30 minutes of the route is compatible with activity 3.

Other routes in table 55 provide other examples. The series of road segments A-F-I-C-K-H is associated with percentage values of the route that when summed are greater than 100%. This indicates that at least two of the activity types are available at the same time. The series of road segments A-F-J-D-E is associated with percentage values of the route that when summed are less than 100%. This indicates that for at least some of the route (e.g., at least 40% of the route in this example) is compatible with no activities. The series of road segments A-F-G-H is associated with percentage values that are all zero. This indicates that no activity types are compatible with any part of the route. The road segment L, which constitutes a complete route, is compatible with all three activity types.

The server 125 or the mobile device 122 may select an activity sequence for the route that meets the driving assistance properties for the segments and optimizes the user's desired activities. Given the desired activities, some routes may maximize the total amount of time that can be spent on activities. Other routes may provide a greater completion of a prioritized activity. An option to adjust duration of the activity is to influence the travel speed on the road segment in question, effectively increasing (or decreasing) the time window for autonomous driving.

Activity Matching Algorithm

Figure 5:
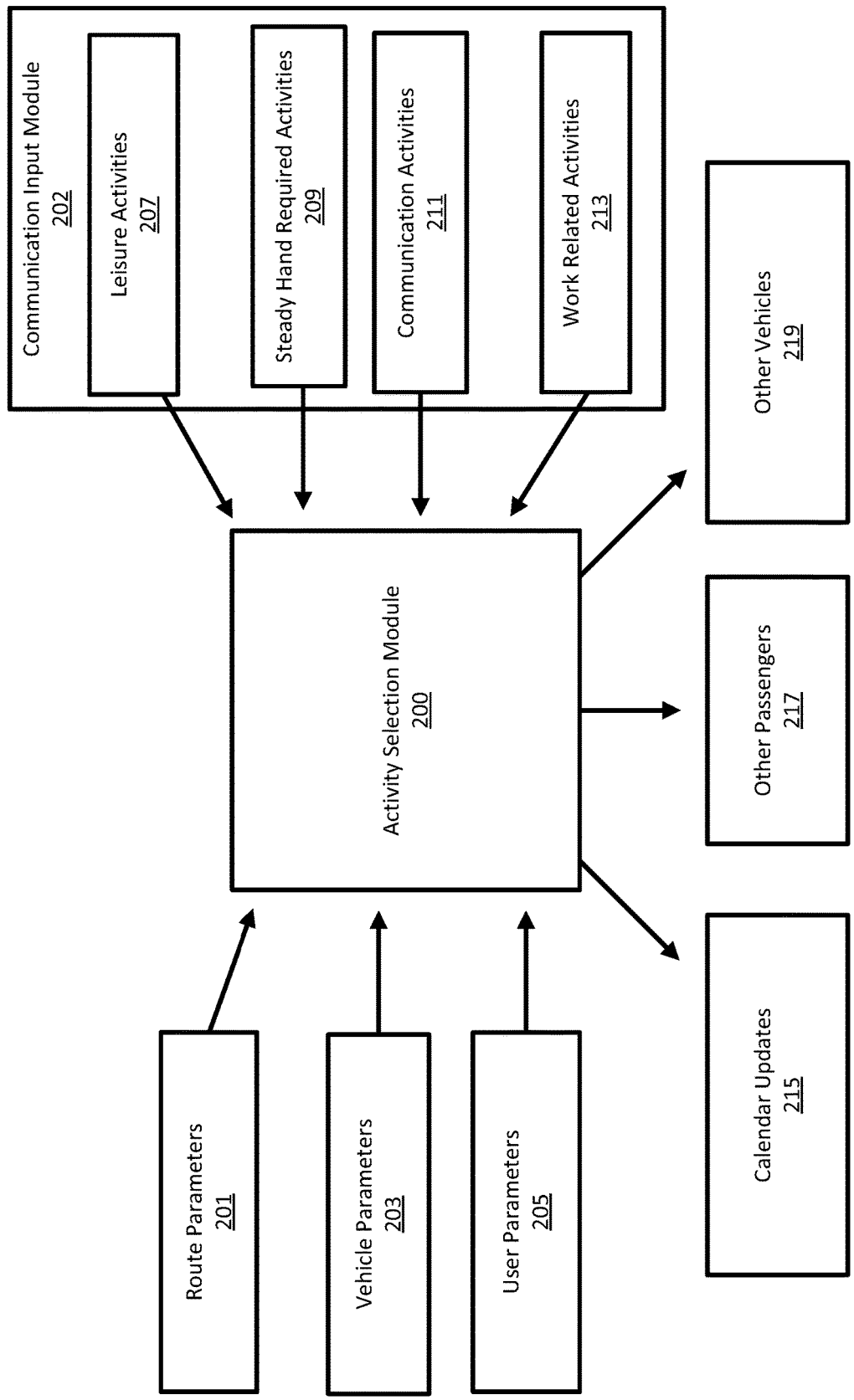
FIG. 5 illustrates an example block diagram for activity planning.

FIG. 5 illustrates an example block diagram for activity planning implemented by the server 125, the mobile device 122, or a combination of the server 125 and the mobile device 122. The diagram includes an activity selection module 200 that receive input data from one or more input modules including route parameters 201, vehicle parameters 203, and user parameters 205. The activity selection module 200 may also receive selection inputs from a communication input module 202 for one or more activity types including leisure activities 207, steady hand activities 209, communication activities module 211, and work related activities 213. The activity selection module 200 may output data to one or more output modules, including the calendar update module 215, the passenger communication module 217, and the other vehicle communication module 219. Additional, different, or fewer components may be included.

The activity selection module 200 calculates a compatibility of a road segment based on data received by the input modules including route parameters 201, vehicle parameters 203, and user parameters 205. From the capability, the road segment is matched with a potential activity or user specified activity. Multiple road segments qualified as autonomous driving or highly assisted driving slots may be matched with multiple activities based on estimated segment travel times. The estimated travel times may be based on static factors such as distance and speed limit, or variable factors such as traffic and weather. The route parameters 201 may be permanent or semi-permanent such as road shape or properties or may be temporary or time-based (temporal) such as a traffic level, a luminosity level, a weather level, or a calendar event. Each of the slots or segments are analyzed according to one or more of the following examples.

The route parameters 201 may include road link geometries accessed from the geographic database. The road link geometries may include a map attribute such as a slope of the road segment, a banking of the road segment, or a curvature of the road segment.

The curvature of the segment may be analyzed to determine how many curves are included in the route. A curvature value may be generated to describe the frequency of the curves and how pronounced are the different curves.

The route parameters 201 may include a road surface type (e.g., pavement, asphalt, concrete, gravel, or dirt). Different surfaces correspond to different vibrations and levels, which may be disruptive of some activities. The route parameters 201 may include road condition data indicative of the condition of the road, including the likelihood of potholes, whether the route is smooth or rough, and/or a frequency of bumps. The road condition data may include the location of potholes or concrete slab edges. The route parameters 201 may include data describing disturbances to the surface of the route including bridges, speed bumps, or thunder strips. If no road surface information is available, the functional class (i.e. type of road—highway, country road, neighborhood street) may be analyzed to determine an expected road quality.

The route parameters 201 may include traffic information. The traffic information may be historical traffic, current traffic, or a combination of historic and current traffic. Traffic information may be collected by mobile devices 122 or vehicles 124. Historical traffic data may be indexed by time of day, day of week, day of the year, or other time divisions. Current traffic may be organized geographically such as by road segment. The traffic information may describe the fluidity or how fluent the traffic for the road segment is or expected to be. Under low traffic conditions, vehicles may face fewer obstacles, which may open up high attentive activities or medium attentive activities. Under high traffic conditions, vehicles may face more obstacles, which may limit the user to medium attentive activities or low attentive activities. The effect of traffic on activities may be configured by the user at the activity selection model 200. If traffic conditions change along the route, new slots may be created or removed in real time (e.g. if a traffic jam ahead on the route is no longer present). In this way the activity profile may be adjusted in real time.

The route parameters 201 may include communication network characteristics. The mobile device 122 communicates through network 127 to server 125. The mobile device 122 may include various types of communication interfaces or communication with the network 127 as the communication network characteristic. The types may include cellular devices (e.g., 3G, 4G, 4G-LTE, 5G or later developed mobile standards), wireless fidelity devices (e.g., IEEE 802.11 family of standards), or another type of device. The mobile device 122 may be configured with access technologies such as WiMAX, 3rd Generation Partnership Project (3GPP) standards, 3GPP2 and WLAN based access architectures. The types of communication may be telephonic, text message, instant message, short message service, or mobile application communication. The 5G may include Edge Computing, which allows very low latency communication, as processing is done at the "edge" of the network, e.g. at the access point. This would allow for data at the mobile device 122 to be collected and distributed quickly among participants in the vicinity of the access point. Vehicles in autonomous mode may communicate with other vehicles nearby through this mechanism.

The communication network characteristic may describe the connection speed and/or bandwidth of the connection. Alternatively, the connection speed and/or bandwidth may be inferred from the type of communication. Different activities may be available depending on the type of communication, the data speed, and/or the bandwidth of the connection.

The network communication characteristic may be detected by the mobile device 122. For example, the mobile device 122 may determine the available types of communication. Alternatively, the network communication characteristic may be determined from the location of the mobile device 122. For example, the database may include network availability in a map of coverage, or the database may include network availability as a road segment parameter. That is, the database may include a table that associated road segments with the available types of network communication. The table or map of network connectivity may be updated with network providers in updated messages received by the mobile device 122 and/or the server 125.

The route parameters 201 may include predicted noise levels. The noise levels may be attributed to busy roadways, tunnels, heightened traffic levels, loud roadside venues (e.g., airports, racetracks, oceans, fire stations, or other points of interest) or predetermined convoy routes. Noise levels may be stored in associated with road segments in the database. The noise levels may be determined from sensor data (e.g., microphones externally mounted or integrated with the mobile device 122). The noise levels may be inferred from detected or predicted traffic levels.

The route parameters 201 may include time of day, day of the year, seasons, or day of the week. In addition, the time of day at which the route is to be traversed can be considered as a further road parameter. Many of the above described conditions are dynamic, and need to be taken into account for a specific time of day. Weather can even interrupt automated or assisted driving service completely.

The route parameters 201 may include the expected luminosity for the route segment. Luminosity is the amount of light available within the vehicle for activities. Luminosity may depend on the time of day or day of the week. In one example, luminosity is a binary value (e.g., 1 for daytime or between sunrise and sunset and 0 for night time or between sunset and sunrise). In addition, as the sun's position may make some activities difficult during sunrise/sunset (e.g. reading, looking at screens, etc.), expected luminosity may also be another metric. Luminosity may also be a variable when going through tunnels, urban canyons, or other areas that partially occlude the sun.

The vehicle parameters 203 may include the autonomous mode of the vehicle or current autonomous state of the vehicle. The automation level may include multiple categories, including whether or not the system performs steering, whether or not the system performs acceleration and/or deceleration, whether or not the system monitors the driving environment, and whether or not the human driver performs fallback driving tasks. The autonomous state may be full automation (all of the driving aspects of the driving tasks are handled in all modes), high automation (all of the driving aspects of the driving tasks are handled without management of a human driver in some driving modes), conditional automation (the driving tasks are handled automatically unless a human driver interrupts), partial automation (some driving aspects of the driving tasks are handled unless interrupted by a human driver), highly assisted driving (the autonomous vehicle may intervene with certain tasks).

The vehicle parameters 203 may include the range of the vehicle. The range of the vehicle for electric vehicles may depend on a charge at one or more batteries. The range of a hybrid vehicle may depend on battery charge and fuel level. The range of a gasoline vehicle may depend on fuel level. Because the trip along the route may be interrupted according to the range of the vehicle in order to recharge or refuel the vehicle, activities that may be performed before or the interruption may be limited in time.

The vehicle parameters 203 may include an occupancy value. The occupancy value may include a quantity of occupants of the vehicle. The occupancy value may describe whether or not each seat of the vehicle is occupied. Different activities may be suitable depending on the number of occupants and/or the location of the occupants. The occupancy parameter may be used to determine whether certain activities can be performed such as multiplayer games. Further, occupants may be identified as children, family, friends or colleagues, adding a further degree of granularity to activity planning. For example, activities with children in the vehicle may differ to the activities with business colleagues. The occupancy parameter may also be used to derive expected noise levels inside of the vehicle as detected by a microphone incorporated with the mobile device 122 or otherwise associated with the interior of the vehicle 124.

The user parameters 205 may also impact the assignment of activities. The user parameters 205 may include availability data or activity preferences. The availability data may include whether or not the user is currently available. The availability data may alternate from various settings including do not disturb, busy, or available. The availability data may specify business hours or personal time. The activity selection module 200 may instruct the mobile device 122 to schedule or reschedule telephone calls, collaborative sessions, or other events based on the selected route and availability of these activities along the route.

The activity preferences may identify one or more activities that are preferred by the user. The activity preferences may be derived from external sources such as social media, online shop profiles, or search history. In turn, the user parameters 205 can be adjusted by learning which activities does the user perform during other road segments (e.g., other road segments that are the same type or classification of autonomous modes). The vehicle could monitor network traffic, interpret conversations on board the vehicle, perform computer vision recognition tasks, or other techniques to determine which activities are being performed on the vehicle. In another example, the user may enter into the mobile device 122 which activity the user is currently or will perform. These activity preferences can also serve to refine recommendations for currently perceived metrics.

The activity selection module 200 is coupled with communication input module 202. The communication input module 202 may include an interface utilized to perform the activity. For example, an application on the mobile device for performing a leisure activity or a work related activity may provide the interface. Alternatively, the activity modules may be a single interface through which the user selects activities.

The communication input module 202 may include a mobile application or interface for movies, music, reading, or online shopping. The communication input module 202 may be on another device such as a television integrated with the vehicle. The communication input module 202 may include a mobile application or interface for communication such as email, text messages, or instant messages. The communication input module 202 may include separate personal interface (e.g., personal email or messaging application) and work interface (e.g., enterprise email, teleconference application, collaboration application). The communication input module 202 may be used to select an activity that requires a steady hand. Examples of steady hand activities include drinking beverage (e.g., hot coffee), applying makeup, drawing, or other activities. Other activities that do not require a steady hand may be associated with no modules or may be associated with the mobile device 122 be placed in a sleep mode or otherwise suspended. These activities may include sleeping, daydreaming, or singing.

The activity selection module 200 performs activity planning by identifying candidate road segments that at a threshold level including autonomous driving capabilities. The activity selection module 200 may first determine which road segments are flagged with autonomous driving capabilities and further limit or define the applicability to activity planning based on the route parameters 201, vehicle parameters 203, and/or user parameters 205. From this analysis of the driving assistance properties of the road segments, the activity selection module 200 may calculate and assign a metric, for example, a quality of service index, based on one or more of the segments, or the entire route. The metric may be a numeric value or a grade of the road segments' suitability for activities.

The activity selection module 200 may also receive selection inputs that define activities requested by the user. The user may simply select activities from a website, a pull down menu or other selector, or a mobile application. The activity selection module 200 may automatically select activities from a calendar or a to-do list.

The activity selection module 200 may match the selected activities to one or more of the road segments of the road. Alternatively, the selected activities may be matched in real time or substantially real time, as the activity selection module 200 matches road segments that the vehicle is approaching or currently traveling on to selected activities. The activity selection module 200 may generate a ranked list of candidate activities for one or more road segments. For example, from the list of activities the activity selection module 200 may select multiple activities that could be performed on each compatible road segment. The activities may be ranked according to future availability (whether or not a subsequent road segment could accommodate the activity), the duration of the activity (whether or not consecutive road segments have an estimated travel time sufficient to complete the activity), a user-configured priority (whether or not this activity has been set as a priority over one or more other activities by the user or another application such as a calendar or schedule) or an on-demand request (whether an incoming call or a request for meeting has been received).

The activity selection module 200 may output data to one or more output modules, including the calendar update module 215, the passenger communication module 217, and the other vehicle communication module 219. Additional, different, or fewer components may be included. The activity selection module 200 may update the calendar according to the planned sequence of activities. That is, a meeting or teleconference may be schedule to synchronize with an upcoming road segments or series of road segments that can accommodate the meeting (e.g., a voice call may require a different level of autonomous driving than a collaboration session). When the activity involves other passengers or may impact other passengers, the activity selection module 200 may notify the devices of other passengers. When the activity involves other passengers or may impact other vehicles, the activity selection module 200 may notify the devices of other vehicles.

Activity Profiles

The server 125 or the mobile device 122 may generate activity profiles for different activities according to the requirements of the activities. The activity profiles may include categories that correspond to parameters of the road segments. Thus, categories in the profiles are matches with parameters of the road segments. The categories in the profiles may include a range that is match with a road segment parameter or arrange of values for a road segment parameter. An index or score may be generated based on the number of matches and/or the degree of matches between the activity profiles and the road segment parameters.

The categories of the activities may include requirement for one or more parameters of the road segments. Example parameters required by the activities may include automation level or mode, duration, smoothness, maneuvers, connectivity, noise level, occupancy, and luminosity. Different activities have a different set of requirements so that they can be performed safely and comfortably during sections of automated driving. It is understood that the different categories in the following activity profiles may be extended depending on the available road, vehicle, and/or user metrics. The metrics can be produced in a numeric (e.g., 1-to-10 scale) ranges, absolute values, binary/discrete values, or another technique. Many activity types may be indifferent to some possible requirement (tagged as N/A). Table 1 describes an example activity profile for offline reading, which is reading that does not require a network connection.

TABLE 1

Activity Type - Offline Reading

|  | Value | Tolerance |
|---|---|---|
| Automation level | 4 | NONE |
| Duration | >10 min | 5% |
| Smoothness | >7 | 10% |
| Maneuvers | <3 | 5% |
| Connectivity | N/A | N/A |
| Noise Level | <65 dB | 10% |
| Occupancy | N/A | N/A |
| Luminosity | <9; >1 | 2% |

For offline reading, a minimum of level 4 automation is required, as the user need not be ready to intervene. The consideration of a minimal time slot for an activity should also be made, hence the duration parameter. A moderate road surface quality may be expected. The metric can be computed from known road surface type and road surface quality reports. In this example, an isolated pothole will probably not be an issue, but a gravel track may be unsuitable for reading. If the road segment provides a metric that fulfills the smoothness requirement, offline reading may be recommended.

Maneuvers may also be considered for online reading. Disruptions such as many curves in succession, overtaking maneuvers in traffic, stop and go traffic, or others may affect offline reading. The disruption may cause the reader to lose focus on the print, be distracted, or cause the driver-passenger becomes carsick, which correspond a lower threshold for maneuvers. Offline reading is independent of connectivity as is occupancy, although occupancy may lead to higher noise levels inside the vehicle (children screaming, music playing, lively conversation, etc.). Luminosity may be important. Reading may be difficult at sunset/sunrise or in a tunnel (which the vehicle could also compensate by tinting windows or using indoor lighting).

The tolerance field values may be associated with each requirement. The tolerance field may provide a percentage or variance that the road segment may deviate from the associated requirement but still meet the needs of the activity. The road segment may deviate for one or more requirements by the amount listed in the tolerance field in a way that is not completely prohibitive for a specific activity. For example, automation level 4, no tolerance, means that the vehicle needs to be able to drive itself without any driver input, for the entire segment. Thus, this activity may be reserved for level 4 vehicles.

The activity selection module 200 may calculate calculating a quality of service index based on the requirements in the activity profile and the road property for the east least one of the road segments. The quality of service index may include an array of values or threshold for different activity types or categories. For example, in Tables 1-4, the value column may form an array of values for the quality of service index. For example, the activity selection module 200 may compare each requirement in the activity profile to that provided by a particular road segment.

The different activity types may be compared individually. When the road segment property exceeds the requirement of the activity a positive value is added to the quality of service index. When the road segment property is less than the requirement of the activity, a negative value is added to the quality of service index. Thus, the quality of service index may be a sum of differences between the requirements of an activity and the properties of a road segment. In another example, when the road segment property exceeds the requirement of the activity a predetermined value (e.g., 1) is added to the quality of service index, and when the road segment property is less than the requirement of the activity, no value is added to the quality of service index. Thus, in this example, the quality of service index is a count, or proportional to a count, of the number of requirements in the activity profile that are met by the road segment.

The activity selection module 200 may calculate the quality of service index for multiple road segments and compare the quality of service index for the road segments in order to match the activities with the road segments.

Table 2 describes an example activity profile for online reading, which is reading that does require a network connection. In this example, the network connectivity requirement includes at least EDGE coverage for data connection. Other values such as speed and bandwidth may be used for network connectivity.

TABLE 2

Activity Type - Online Reading

|  | Value | Tolerance |
|---|---|---|
| Automation level | 4 | NONE |
| Duration | >10 min | 5% |
| Smoothness | >7 | 10% |
| Maneuvers | <3 | 5% |
| Connectivity | >EDGE | NONE |
| Noise Level | <65 dB | 10% |
| Occupancy | N/A | N/A |
| Luminosity | <9; >1 | 2% |

Table 3 describes an example activity profile for a business phone conversation. The business phone conversation may be less sensitive to maneuvers. The business phone conversation may be less susceptible to road roughness. The overall automation level requirement may be lower for the business phone conversation. However, the business phone conversation may require confidentiality requirements, which may be demonstrated by the occupancy requirement, for example, restricting to only driver-passenger or business colleagues as passengers.

TABLE 3

Activity Type - Business Call

|  | Value | Tolerance |
|---|---|---|
| Automation level | 3 | NONE |
| Duration | >5 min | 5% |
| Smoothness | <4 | 10% |
| Maneuvers | <6 | 5% |
| Connectivity | >2 G | NONE |
| Noise Level | <60 dB | 10% |
| Occupancy | 1; n if business colleagues | N/A |
| Luminosity | N/A | N/A |

Table 4 describes an example activity profile for hot beverage drinking. Activities such as beverage drinking may only require an even lower minimum for the automation level. Beverage drinking may have a relatively higher smoothness requirement for the road segments to prevent spilling the beverage. Beverage drinking and other simpler activities may be performed without any regard to connectivity, noise levels, and other requirements. Activity profiles may be provided for other activities such as napping, applying makeup, texting, watching television or other video, conversing with other passengers, playing games, drawing, or coloring.

TABLE 4

Activity Type - Hot Beverage Drinking

|  | Value | Tolerance |
|---|---|---|
| Automation level | 3 | NONE |
| Duration | >10 min | 5% |
| Smoothness | >9 | 10% |
| Maneuvers | <2 | 5% |
| Connectivity | N/A | N/A |
| Noise Level | N/A | N/ |
| Occupancy | N/A | N/A |
| Luminosity | N/A | N/A |

The activity selection module 200 may generate a road segment table for matching selected activities with the road segments of the route. A route planning application provides information about the different road segments, taking into account information from not only the route parameters, but also from the vehicle and user parameters. Table 5 illustrates the overall route parameters such as the vehicle automation level, which describes the maximum autonomous driving level of the vehicle, the occupancy, the relevant user calendar entries, and the activity preferences.

TABLE 5

| Overall route parameters | |
|---|---|
| Vehicle Automation Level | 4 |
| Occupancy | 1 |
| User Calendar entries | [business 9:00-12:00; private 12:00-13:00; business 13:00 . . . ] |
| Activity Preferences | [reading; video games; movies . . . ] |

Table 6 illustrates the road segment properties for each of the road segments of the route (road segment 1, road segment 2 . . . road segment n) according to the road segment properties.

| Segment 1 | Start: (time, location, link . . . )End: (time, location, link . . . ) |
|---|---|
| Duration | 20 |
| Smoothness | 3.5 |
| Maneuvers | 4.2 |
| Connectivity | LTE |
| Noise Level | [62-75] dB |
| Luminosity | [3, 6] |
| Segment 2 | Start: (time, location, link . . . )End: (time, location, link . . . ) |
| Duration | 20 |
| . . . | . . . |
| Segment n | Start: (time, location, link . . . )End: (time, location, link . . . ) |
| . . . | |

The expected route characteristics are matched with the activity profiles based on overlap of the road segment properties and the requirements of the activity profiles and corresponding durations. Separate matching may be performed for the driver-passenger as well as to the other vehicle passengers.

The other passengers are not necessarily restricted to autonomous driving segments and may be paired with activities during traditional driving only segments. In one example, segments that are suitable for business calls can be identified and marked in an online calendar, periods of availability can be communicated to externals as messaging service status (available, busy, do not disturb), and coordination of activities with passengers in other vehicles can be started.

The activity recommendations can be presented to the user in a ranked fashion, showing which are the most suited activities for a specific road section. The activity selection module 200 may determine profile adjustments, which may occur while the vehicle is traveling along the route from road segment to road segment.

The activity selection module 200 may modify the profiles of activity based on performance data received from mobile device 122 and/or vehicles 124. It is accepted that not all activity profiles can be defined from the beginning and that different driver-passengers have different tolerances for conditions during performing the activities. To this end, the vehicle can monitor the segment, the driver-passenger and passengers to determine when and where activities are performed. If it is an unknown activity with no activity profiles, activity selection module 200 may inquire about the name of the activity, and create new activity profile based on the monitored segment metrics. For activities with activity profiles, the activity selection module 200 may determine whether there is a significant deviation between the current road segment parameters and the activity profile requirements. If the deviation is significant, the activity selection module 200 may update the activity profile by modifying the activity profile requirements to meet the monitored properties or to average (e.g., weighted average) the monitor properties with the requirements of the activity profile. The activity profile requirements may be increased or decreased. For example, the driver may be comfortable performing activities that would otherwise would not be recommended because the system regarded the segment to be inapplicable to the activity (e.g. too bumpy). However, since the user is not bothered (e.g., by the bumpiness), the requirement specified in the activity profile may be modified.

The activity selection module 200 may also inquire the user about comfort levels when performing the activity. The activity selection module 200 may generate messages for comfort level (e.g., Are you performing Activity X easily in the current conditions?). The activity selection module 200 may collect sensor data (e.g., camera images) in order to monitor facial expressions or biometrics of the user while performing the activity.

Over time, the activity selection module 200 may determine what types of activities that the user is doing on each type of automated segments. Example user preferences may include making phone calls on highways, reading news articles when in stop and go, and/or reading books on segments longer than a preset time period (e.g., 20 min). The activity selection module 200 may calculate the quality of service index for these types of road segments and on subsequent road segments of the same type.

In addition, the activity profiles can be handled online. The activity selection module 200 may analyze the data collected from multiple users or all users, i.e. based on crowdsourcing information, and recommend the activities which are the commonly done on given segments or segment types. Another approach could also be to detect the activities changes on segments, that is if many users start reading and stop after a short time, there may be some reason why it happens, and the activity profiles may be updated accordingly.

Figure 6:
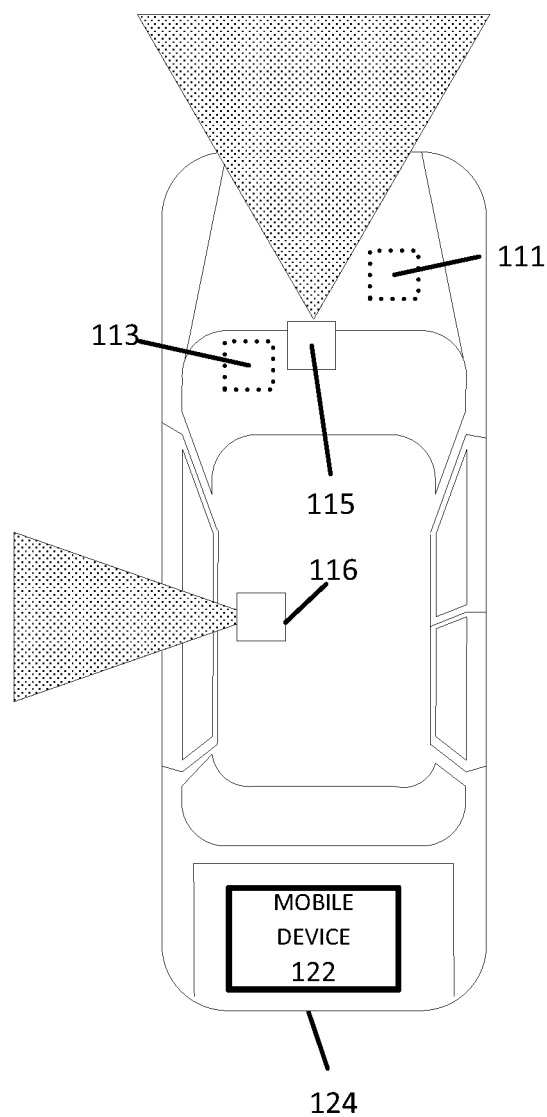
FIG. 6 illustrates an example assisted driving vehicle from the system of FIG. 1.

FIG. 6 illustrates an example vehicle 124 for collecting data regarding the vehicle parameters 203 and user parameters 205. A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle. The sensor array may include multiple sensors. Example sensors include an optical distance system such as a LiDAR system 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera. The LiDAR system 116, an image capture system 115 may collect sensor data that describes whether or not the vehicle 124 is traveling in a tunnel, whether or not the sun is shining, whether or not the current weather includes precipitation, or other factors external to the vehicle 124.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor. The vehicle sensor 113 may include a microphone, an internal camera, or another sensor to detect the internal environment of the vehicle 124.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated. The assisted driving vehicle may be selected a route based on any of the examples herein, including in response to activity selections.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to pass the initial observation location or road object in response to the request for additional observations.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and the request for additional observations for the road object.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle.

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

Figure 7:
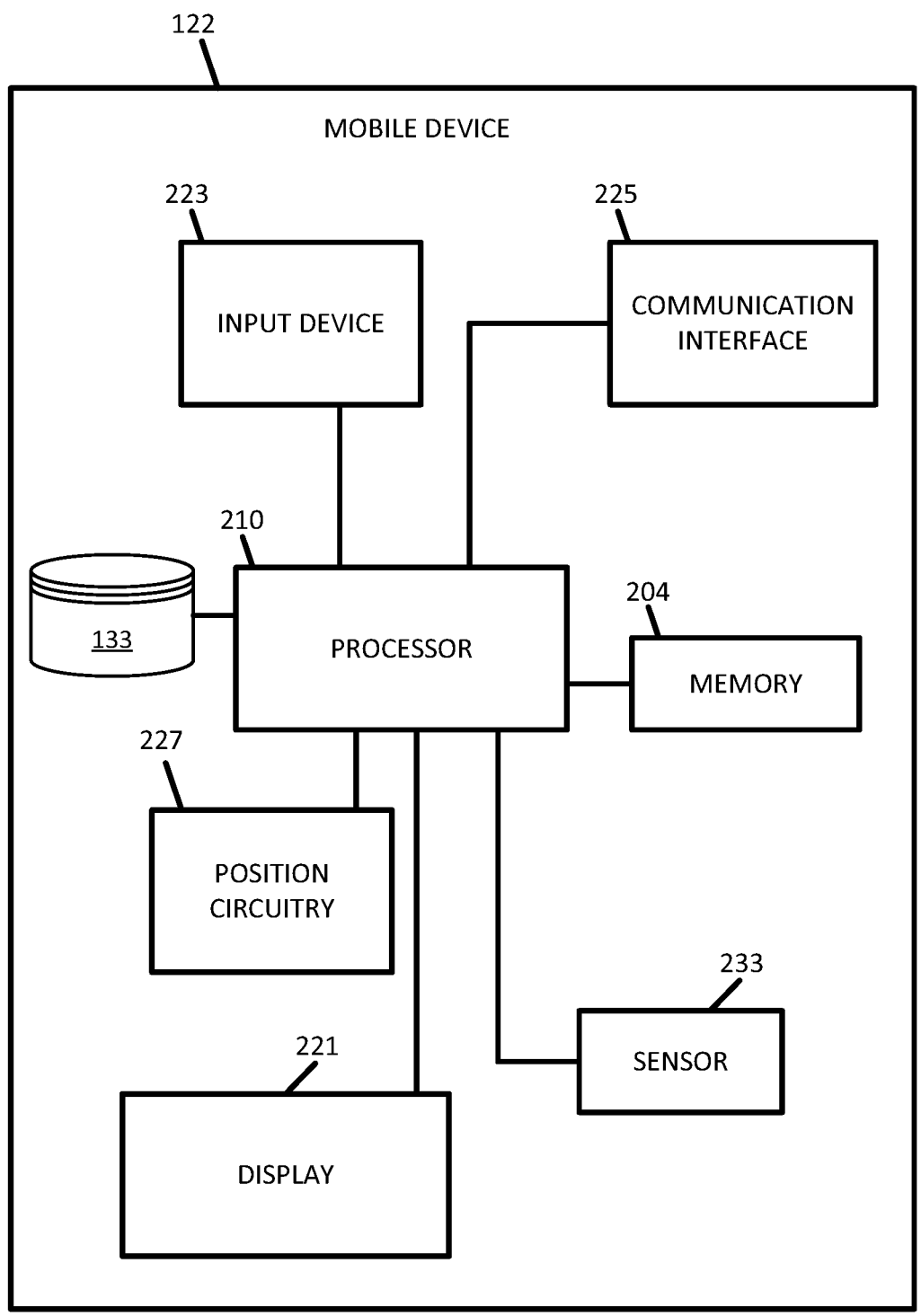
FIG. 7 illustrates an example mobile device.
Figure 8:
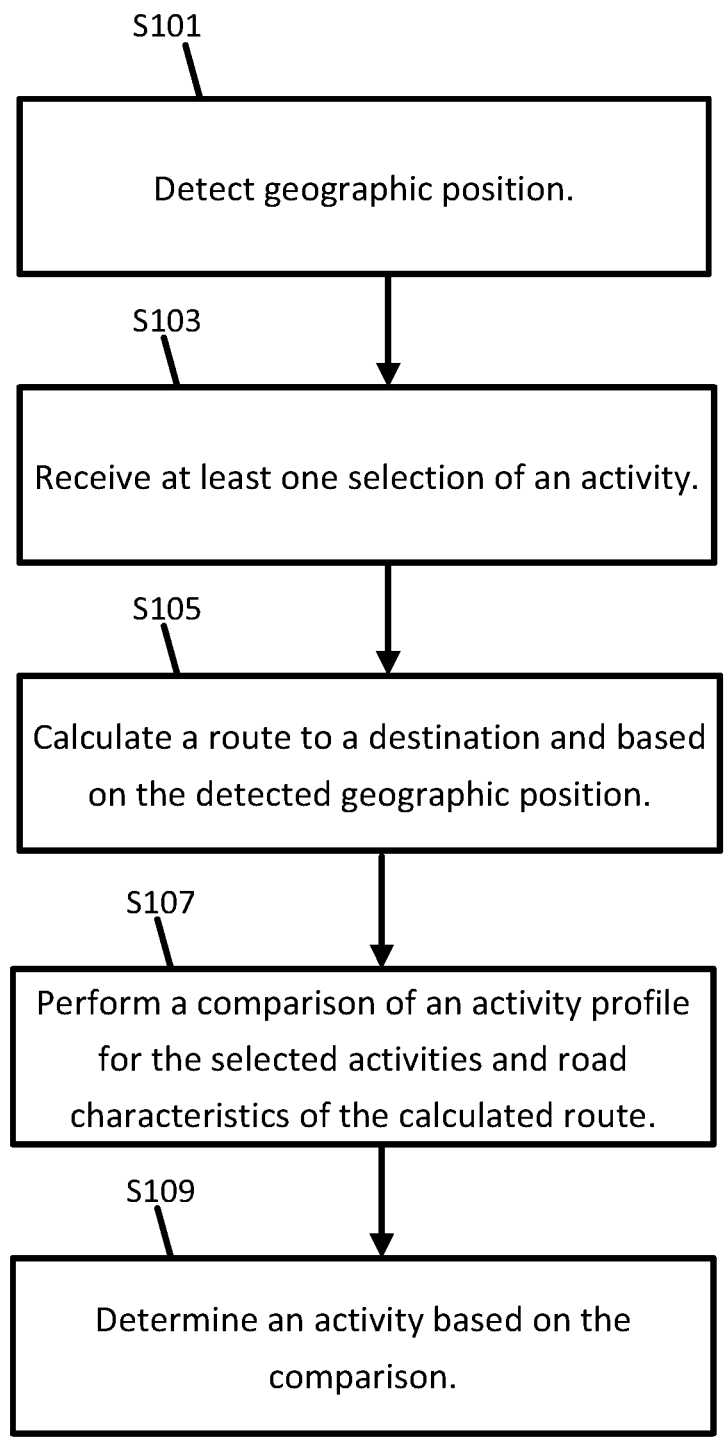
FIG. 8 illustrates an example flowchart for the mobile device of FIG. 7.

FIG. 7 illustrates an exemplary mobile device 122 of the system of FIG. 1. The mobile device 122 includes a processor 210, a vehicle database 133, a memory 204, an input device 223, a communication interface 225, position circuitry 227, a display 221, a sensor 233. The input device 223 may receive settings to select activities or adjust the activity profiles of activities. The input device 223 may receive entry of road segments, a route, or a destination or waypoints to define a route. Additional, different, or fewer components are possible for the mobile device 122. FIG. 8 illustrates an example flowchart for the mobile device of FIG. 7. Additional, different, or fewer steps may be included.

At act S101, the position circuitry 227 or the processor 210 detects a geographic position of the mobile device 122 or the vehicle and sends the geographic location for the mobile device 122 to a server. The position circuitry 227 is one example means for detecting or determining a geographic position. The processor 210 also includes circuitry serving as means for detecting or determining a geographic position. The detected geographic position of the mobile device 122 may include a latitude and longitude pair. The geographic position may be detected or sampled at periodic intervals in time or distance. The sensor 233, which may include distancing sensors, range sensor, image sensors, or another sensor as described with respect to FIG. 6 may also provide information for determining the geographic position of the mobile device 122.

At act S103, the processor 210 or the communication interface 225 receives at least one selection of an activity. The selection may be made by at display 221 or input device 223 or opening a mobile application (i.e., attempting to use a mobile application), or selecting activities from a menu. The communication interface 225 is an example for a means for receiving data indicative of the activity selection. The processor 210 may include circuitry or a module or an application specific controller as a means for receiving the data indicative of the activity selection. The display 221 or input device 223 are examples of means for receiving the selection of the one or more activities.

At act S105, the processor 210 calculates a route to a destination using road segments accessed from the database. The processor 210 may include circuitry or a module or an application specific controller as a means for calculating the route according to data received by the position circuitry 227. In one example, the route is calculated according to a shortest path algorithm or shortest duration algorithm. In another example, the processor 210 is configured to determine possible routes from the road segments of the geographic database and select one of the possible routes based on the at least one selection of the activity.

At act S107, the processor 210 compares an activity profile for the selected activities to road characteristics of the road segments of the calculated route. The activity profile may include threshold values, acceptable ranged, or minimum levels for various road characteristics. Road characteristics may include quality characteristics (e.g., surface type, roughness, known hazards, potholes), curviness of the route segment (e.g. curves per km, sharp turns), traffic levels, connectivity (e.g. cellular connection type, expected bandwidth, or other factors), noise levels (from traffic, collected from vehicle sensors, or other sources), or luminosity (e.g. expected light intensity according to daytime, incoming lights from other vehicles).

At act S109, the processor 210 determines one or more activities based on the at least one selection of the activity at the at least one driving assistance characteristic for the route to the destination. The processor 210 may include circuitry or a module or an application specific controller as a means for calculating the activity sequence according to any of the matching algorithms described herein. The processor 210 may determine possible activity sequences from the route to the destination and select an activity sequence from the possible activity sequences. The determination of the activity sequence may be based on a quality of service index based on a comparison of the driving assistance characteristic for the segments and requirements for an activity. The quality of service index may be calculated based on differences between multiple driving assistance properties and corresponding activity requirements.

The processor 210 may include a routing module including an application specific module or processor that calculates routing between an origin and destination. The routing module is an example means for generating a routing command based on the current location of the mobile device 122 from the occupancy grid comparison. The routing command may be a route from the route to the destination. The routing command may be a driving instruction (e.g., turn left, go straight), which may be presented to a driver or passenger, or sent to an assisted driving system. The display 221 is an example means for displaying the routing command. The routing command may be derived from a road network or map data stored in database 133. The database 133 is an example means for storing map data including a road network.

The mobile device 122 may generate a routing instruction based on the vehicle database 133. The routing instructions may be provided by display 221. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system, or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

Figure 9:
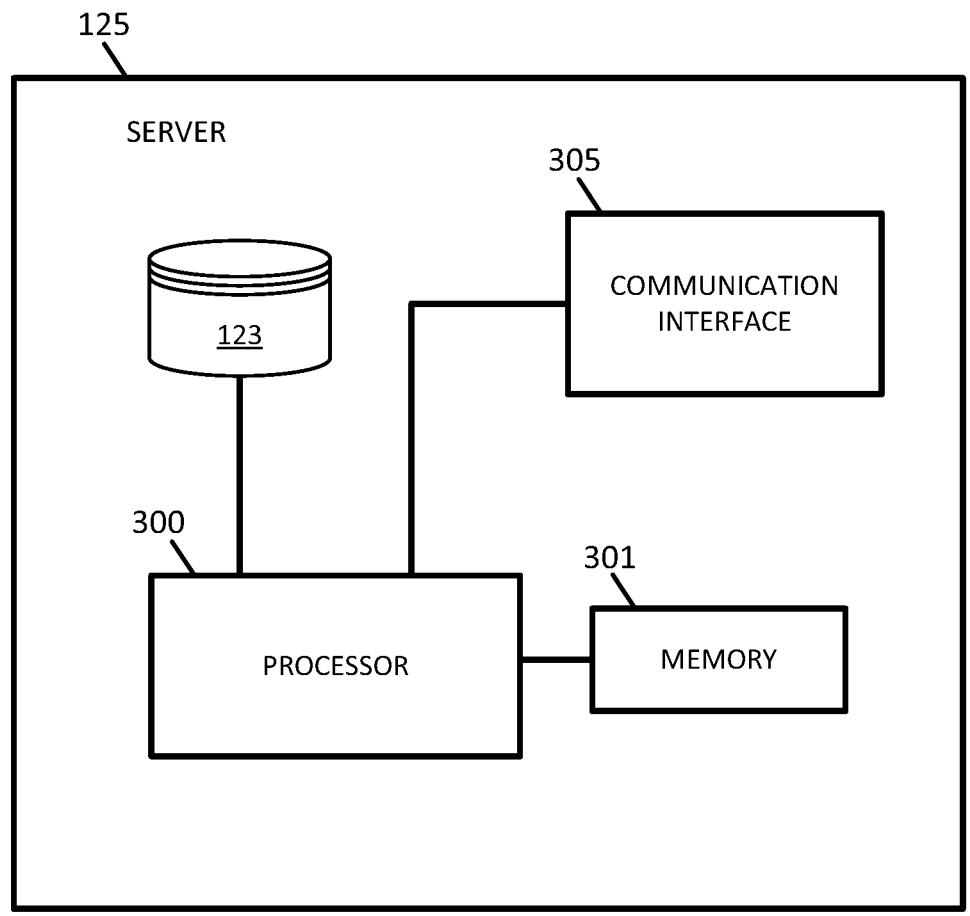
FIG. 9 illustrates an example server.
Figure 10:
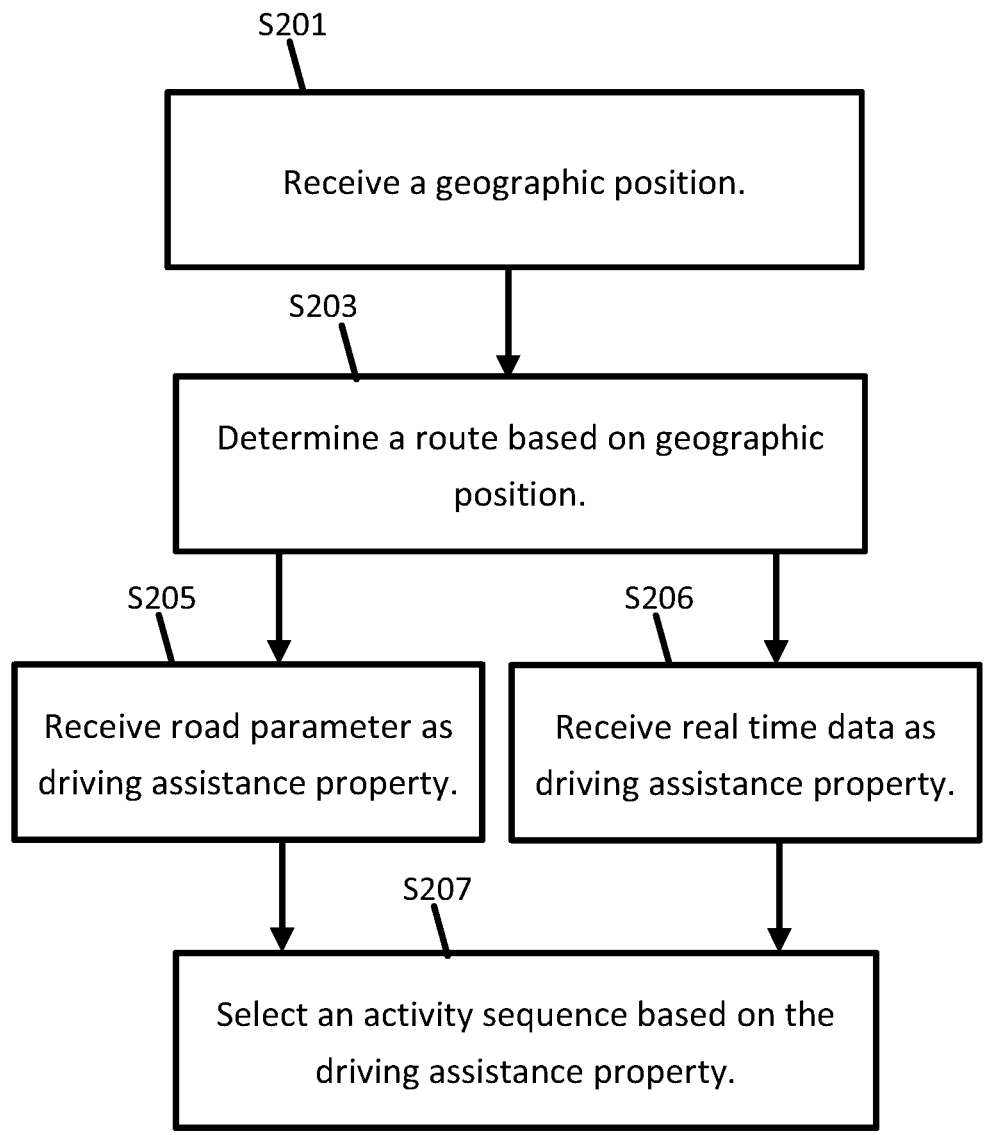
FIG. 10 illustrates an example flowchart for the server of FIG. 9.

FIG. 9 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Additional, different, or fewer components may be provided in the server 125. FIG. 10 illustrates an example flowchart for the operation of server 125 in building an occupancy grid. Additional, different, or fewer acts may be provided. Alternatively, the server 125, or server component, tasked with performing activity recommendations may also be implemented onboard the vehicle/mobile device, and may rely on offline databases or online information sources.

At act S201, the processor 300 receives data indicative of a geographic position, for example from a database 123 or from mobile device 122 as generated by the position circuitry 227. The communication interface 305 may be means for receiving data indicative of a geographic position. The processor 300 may include circuitry or a module or an application specific controller as a means for receiving data indicative of a geographic position.

At act S203, the processor 300 determines a route based on the geographic position. The processor 300 may include a routing module including an application specific module or processor that calculates routing between an origin and destination. The routing module is an example means for generating a routing command based on the current location of the mobile device 122 from the occupancy grid comparison.

At act S205 and/or S206, the processor 300 or the communication interface 305 receives the road property. The processor 300 may include circuitry or a module or an application specific controller as a means for receiving the road property. As shown in S205, the road property may be a road parameter for the segment that is permanent or semi-permanent such as the shape, size, smoothness, or length of the road segments. The road property may be detected by the sensor 233 in real time or accessed from the database. As shown in S206, the road property may be a road parameter for the segment that is temporary or real time data such as traffic or weather. The road property may be determined by the processor 210 or received from a traffic server or weather server.

At act S207, the processor 300 selects an activity sequence for the route based on the road property for the road segments. The activity sequence may be detected according to any of the algorithms described herein. The processor 300 may include circuitry or a module or an application specific controller as a means for selecting the activity sequence.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

The controller 210 and/or processor 300 may include a general processor, digital signal processor, an application specific integrated circuit (ASIC), field programmable gate array (FPGA), analog circuit, digital circuit, combinations thereof, or other now known or later developed processor. The controller 210 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 225 and/or communication interface 305 may include any operable connection. An operable connection may be one in which signals, physical communications, and/or logical communications may be sent and/or received. An operable connection may include a physical interface, an electrical interface, and/or a data interface. The communication interface 225 and/or communication interface 305 provides for wireless and/or wired communications in any now known or later developed format.

The databases 123 and 133 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data. Other contents of the database relevant for this invention are: road quality attributes, road surface attributes, location of road surface hazards (e.g. potholes), road geometry attributes (e.g. curves/curve radius, number of lanes, road elevation profile attributes), areas of communication network coverage, noise level attributes, luminosity conditions, or other attributes.

The databases may include historical traffic speed data for one or more road segments. The databases may also include traffic attributes for one or more road segments. A traffic attribute may indicate that a road segment has a high probability of traffic congestion.

The input device 223 may be one or more buttons, keypad, keyboard, mouse, stylus pen, trackball, rocker switch, touch pad, voice recognition circuit, or other device or component for inputting data to the mobile device 122.

The input device 223 and display 221 may be combined as a touch screen, which may be capacitive or resistive. The display 221 may be a liquid crystal display (LCD) panel, light emitting diode (LED) screen, thin film transistor screen, or another type of display. The output interface of the display 221 may also include audio capabilities, or speakers. In an embodiment, the input device 223 may involve a device having velocity detecting abilities.

The positioning circuitry 227 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 227 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 227 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 227 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method comprising:
identifying a route to at least one destination, the route including a plurality of segments;
identifying data indicative of driving assistance availability;
accessing at least one road property for at least one of the plurality of segments for the route;
performing a comparison of at least one activity profile to the at least one road property; and
selecting an activity for the route based on the comparison and the driving assistance availability.

Embodiment 2

The method of embodiment 1, wherein the data indicative of driving assistance availability describes a type of driving assistance available for a vehicle associated with the route.

Embodiment 3

The method of embodiments 1-2, wherein the type of driving assistance includes full automation mode, semi-automation mode, conditional automation mode, partial automation mode, driving assistance mode, or tradition driving mode.

Embodiment 4

The method of embodiments 1-3, wherein the at least one road property describes a type of road segment for the at least one of the plurality of segments.

Embodiment 5

The method of embodiments 1-4, wherein the type of road segment includes data indicative of a highway, a collector road, an arterial road, or a local road.

Embodiment 6

The method of embodiments 1-5, wherein the at least one road property includes a temporal state of the at least one road segment.

Embodiment 7

The method of embodiments 1-6, wherein the temporal state includes data indicative of a traffic level, a luminosity level, a weather level, or a calendar event.

Embodiment 8

The method of embodiments 1-7, wherein the at least one road property is associated with a road link geometry or shape.

Embodiment 9

The method of embodiments 1-8, wherein the at least one road property is associated with a road surface type, a road surface condition, or a speed limit.

Embodiment 10

The method of embodiments 1-9, wherein the at least one road property includes a communication network characteristic.

Embodiment 11

The method of embodiments 1-10, further comprising:
calculating a quality of service index based on the road property for the at least one of the plurality of segments and requirements for an activity; and
performing a comparison of the quality of service index for multiple road segments,
wherein the activity sequence is selected based on the comparison.

Embodiment 12

The method of embodiments 1-11, wherein the quality of service index is based on differences between multiple driving assistance properties and corresponding activity requirements.

Embodiment 13

The method of embodiments 1-12, wherein one or more road segments having a higher quality of service index is selected for a preferred activity in the activity sequence.

Embodiment 14

An apparatus comprising:
a geographic database including road segments associated with at least one road characteristic;
a user input device configured to receive at least one selection of an activity; and
a controller configured to calculate a route to a destination using road segments accessed from the database and identify an activity sequence based on the at least one selection of the activity at the at least one road characteristic for the route to the destination.

Embodiment 15

The apparatus of embodiment 14, wherein the controller is configured to determine a plurality of possible routes from the road segments of the geographic database and select one of the plurality of possible routes based on the at least one selection of the activity.

Embodiment 16

The apparatus of embodiments 14-15, wherein the controller is configured to determine a plurality of possible activity sequences from the route to the destination and select the activity sequence from the plurality of possible activity sequences.

Embodiment 17

The apparatus of embodiments 14-16, wherein the controller is configured to calculate a quality of service index based on the road characteristic for the at least one of the plurality of segments and requirements for an activity and perform a comparison of the quality of service index for multiple road segments, wherein the activity sequence is selected based on the comparison.

Embodiment 18

The apparatus of embodiments 14-17, wherein the controller is configured to calculate the quality of service index based on differences between multiple driving assistance properties and corresponding activity requirements.

Embodiment 19

The apparatus of embodiments 14-18, wherein one or more road segments having a higher quality of service index is selected for a preferred activity in the activity sequence.

Embodiment 20

An apparatus, configured to perform and/or control the method of any of embodiments 1-13 or comprising means for performing and/or controlling any of embodiments 1-13.

Embodiment 21

An apparatus, comprising at least one processor and at least one memory including computer program code for one or more programs, the at least one memory and the computer program code configured to, with the at least one processor, to perform and/or control the method of any of embodiments 1-13.

Embodiment 22

A computer program comprising instructions operable to cause a processor to perform and/or control the method of any of embodiments 1-13, when the computer program is executed on the processor.

We claim:

1. A method comprising:
identifying a route to at least one destination, the route including a plurality of segments received from a geographic database;
identifying data indicative of driving assistance availability;
accessing, from the geographic database and in response to the data indicative of the driving assistance availability, at least one road property for at least one of the plurality of segments for the route;
performing, by a controller, a comparison of at least one activity profile to the at least one road property; and
selecting, by the controller, an activity for the route based on the comparison and the driving assistance availability.

2. The method of claim 1, wherein the data indicative of driving assistance availability describes a type of driving assistance available for a vehicle associated with the route.

3. The method of claim 2, wherein the type of driving assistance includes full automation mode, semi-automation mode, conditional automation mode, partial automation mode, driving assistance mode, or traditional driving mode.

4. The method of claim 1, wherein the at least one road property describes a type of road segment for the at least one of the plurality of segments.

5. The method of claim 4, wherein the type of road segment includes data indicative of a highway, a collector road, an arterial road, or a local road.

6. The method of claim 1, wherein the at least one road property includes a temporal state of the at least one road segment.

7. The method of claim 6, wherein the temporal state includes data indicative of a traffic level, a luminosity level, a weather level, or a calendar event.

8. The method of claim 1, wherein the at least one road property is associated with a road link geometry or shape.

9. The method of claim 8, wherein the at least one road property includes a communication network characteristic.

10. The method of claim 1, wherein the at least one road property is associated with a road surface type, a road surface condition, or a speed limit.

11. The method of claim 1, further comprising:
calculating a quality of service index based on the road property for the at least one of the plurality of segments and requirements for an activity; and
performing a comparison of the quality of service index for multiple road segments, wherein an activity sequence is selected based on the comparison.

12. The method of claim 11, wherein the quality of service index is based on differences between multiple driving assistance properties and corresponding activity requirements.

13. The method of claim 11, wherein one or more road segments having a higher quality of service index is selected for a preferred activity in the activity sequence.

14. An apparatus comprising:
a geographic database including road segments associated with at least one road characteristic;
a user input device configured to receive at least one selection of an activity; and
a controller configured to calculate a route to a destination using road segments accessed from the database and identify an activity sequence based on the at least one selection of the activity at the at least one road characteristic for the route to the destination, the activity sequence including a first activity associated with a first road segment of the route and a second activity associated with a second road segment of the route.

15. The apparatus of claim 14, wherein the controller is configured to determine a plurality of possible routes from the road segments of the geographic database and select one of the plurality of possible routes based on the at least one selection of the activity.

16. The apparatus of claim 14, wherein the controller is configured to determine a plurality of possible activity sequences from the route to the destination and select the activity sequence from the plurality of possible activity sequences.

17. The apparatus of claim 14, wherein the controller is configured to calculate a quality of service index based on the road characteristic for the road segments and requirements for an activity and perform a comparison of the quality of service index for multiple road segments, wherein the activity sequence is selected based on the comparison.

18. The apparatus of claim 17, wherein the controller is configured to calculate the quality of service index based on differences between multiple driving assistance properties and corresponding activity requirements.

19. The apparatus of claim 17, wherein one or more road segments having a higher quality of service index is selected for a preferred activity in the activity sequence.

20. A non-transitory computer readable medium including instructions that when executed are operable to:
- select a plurality of segments from a geographic database;
- access a road characteristic for at least one of the plurality of segments; and
- select, by a controller, an activity sequence for the plurality of segments based on the road characteristic for the at least one of the plurality of segments, the activity sequence including a first activity associated with a first road segment of a route and a second activity associated with a second road segment of the route.

* * * * *